US006305643B1

(12) United States Patent
Sankrithi

(10) Patent No.: US 6,305,643 B1
(45) Date of Patent: Oct. 23, 2001

(54) AUTOMATED GALLEY CART STOWAGE SYSTEM

(75) Inventor: Mithra M. K. V. Sankrithi, Federal Way, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/436,785

(22) Filed: Nov. 8, 1999

(51) Int. Cl.[7] ........................................ B64C 1/20

(52) U.S. Cl. .............................. 244/118.1; 244/118.5

(58) Field of Search ......................... 244/118.1, 118.5, 244/137.1, 137.2

(56) References Cited

U.S. PATENT DOCUMENTS

| | | | |
|---|---|---|---|
| Re. 32,176 | | 6/1986 | Vernon . |
| 3,517,899 | | 6/1970 | Vernon . |
| 3,615,003 | | 10/1971 | Rust . |
| 3,999,630 | | 12/1976 | McPhee . |
| 4,653,707 | | 3/1987 | Hamilton et al. . |
| 4,660,787 | | 4/1987 | Sprenger et al. . |
| 5,074,496 | | 12/1991 | Rezag et al. . |
| 5,314,143 | * | 5/1994 | Luria ................................ 244/118.1 |
| 5,322,244 | | 6/1994 | Dallmann et al. . |
| 5,474,260 | | 12/1995 | Schwertfeger et al. . |
| 5,496,000 | | 3/1996 | Mueller . |
| 5,542,626 | | 8/1996 | Beuck et al. . |
| 5,727,654 | | 3/1998 | Roessner et al. . |
| 6,059,229 | * | 5/2000 | Luria ................................ 244/118.1 |

FOREIGN PATENT DOCUMENTS 42 08 438 A1 9/1993 (DE) .

* cited by examiner

*Primary Examiner*—Peter M. Poon
*Assistant Examiner*—Kevin Jakel
(74) *Attorney, Agent, or Firm*—Christensen O'Connor Johnson Kindness PLLC

(57) ABSTRACT

An automated cart stowage system is provided for use in an aircraft having a passenger deck with a galley and a lower deck located below the passenger deck. The system includes a number of movable galley carts, a container sized and shaped to be located within the lower deck, a passageway located in the container and extending vertically upward into the galley, a cart lift for automatically transferring at least one galley cart at a time between the passenger deck and the container, and access device positionable within the passageway. The container is used for storing the galley carts during flight. The container includes first and second interior regions. The galley carts are storable end-to-end in the second region. An access space is left available between carts. During normal operations, the cart lift transfers carts between the passenger deck and the container. During anomalous conditions, the access device is made available to assist an attendant in entering and exiting the container via the passageway to thereby manually transfer material to and from the carts stored in the container. The first region provides an aisle for the attendant to access the carts. The access space between carts allows the attendant to shift carts in order to access the contents of each cart.

11 Claims, 4 Drawing Sheets

AUTOMATED GALLEY CART STOWAGE SYSTEM

FIELD OF THE INVENTION

The present invention relates to an aircraft food storage and supply system, and more particularly, to a galley cart system for an aircraft having an upper deck and a lower deck with a galley arranged on the upper deck, the food carts being movable between the galley and the lower deck.

BACKGROUND OF THE INVENTION

Commercial aircraft are typically fitted with galleys for storing and preparing food provided in meal services to passengers. Galleys include storage spaces for galley carts, which in turn contain food trays, beverages, silverware, etc. Galleys may also include ovens for heating food, coffeemakers, trash receptacles, and countertop space for food service preparation.

Current galley systems have a number of shortcomings. For example, in long-range flights in which two or three meals are served, large galleys are needed to accommodate the large number of galley carts needed to store the food and waste. These large galleys occupy a lot of space, and as a result, reduce the number of passenger seats that can be fitted on the passenger deck. This reduces the amount of revenue for the airline. It is known to provide cart and/or tray stowage in the aircraft lower lobe. However, known lower lobe stowage systems typically use automated components that, upon failure, do not allow manual access to the lower storage area. A further disadvantage of known galley systems is that in many commercial aircraft configurations, the galley is located on the passenger deck adjacent to where passengers are seated. The passengers can thus view portions of the food preparation and cleanup, which may be unpleasant to view, especially during cleanup.

Thus, a need exists for a commercial aircraft galley arrangement in which a large number of carts may be used without interfering with the number of passengers the airline is able to accommodate and without interfering with galley service during anomalous conditions. Ideally, such an improved galley system will not create an unpleasant environment for passengers to view. The present invention is directed to fulfilling these needs and others as described below.

SUMMARY OF THE INVENTION

In accordance with aspects of the present invention, an automated cart stowage system is provided for use in an aircraft having a passenger deck with a galley and a lower deck located below the passenger deck. The system includes a number of moveable galley carts, a container, a passageway connecting the container with the galley, a cart lift, and access means. The container is sized and shaped to be located within the lower deck near the galley. The car lift is provided in the passageway to automatically transfer at least one galley cart at a time between the galley and the container. The access means are positionable within the passageway to assist a person in moving between the galley and the container.

During normal operations, the container is used for storing the galley carts during flight. Unused carts can be brought up from the container via the cart lift, while used carts can be stowed back in the container, away from the passengers. During anomalous conditions, the access means is made available to assist an attendant in entering and exiting the container via the passageway. In this manner, the attendant can manually transfer material to and from the carts stored in the container even though the cart lift system may be inoperative.

In accordance with further aspects of this invention, the container includes a first end and a second end. The distance between the ends define a longitudinal direction. The layout of the container includes first and second interior regions that extend between the container first and second ends. The galley carts are stowable end-to-end in one of these regions. The other region is left open to serve as an aisle way for an attendant to pass. In addition, an access space is left available between the carts. Should the attendant need to manually access the carts, he or she may do so by translating the carts to position the access space at the desired cart where objects can then be moved to and from each individual cart.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is a lower lobe galley stowage system in which a person may enter the lower lobe storage area to manually access the contents of the stowed carts.

Figure 1:
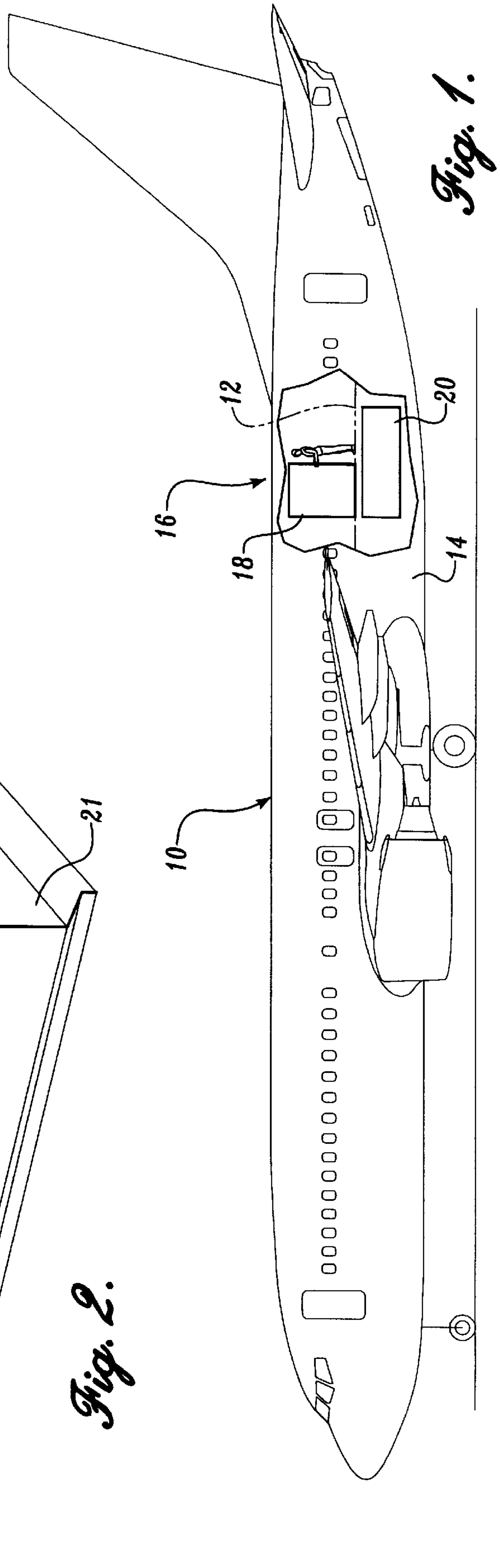
FIG. 1 is a schematic side view of an aircraft having a galley cart stowage system formed in accordance with the present invention.
Figure 2:
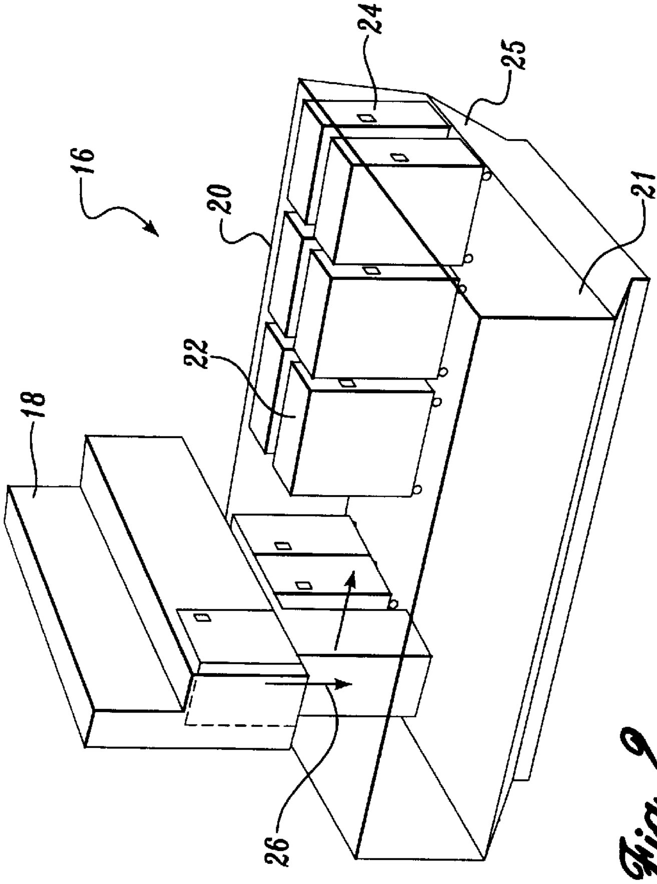
FIG. 2 is a schematic perspective view of portions of the system shown in FIG. 1.

Referring to FIG. 1, a commercial aircraft 10 includes a passenger deck 12 and a lower lobe region 14 located below the passenger deck. A galley cart stowage system 16 includes one or more galleys 18 provided on the passenger deck 12 at various locations (only one galley is shown in FIG. 1). A container 20 is provided in the lower lobe 14 at a location below the galley for the purpose of storing food carts during flight. The container 20 is sized and shaped to be located within the aircraft lower lobe, either by installing a complete container into the lower lobe, or by building up a container during aircraft manufacture. The container 20 is shown with optional sloped lower side walls 25, similar in shape to the sloped lower side wall surfaces of conventional airplane cargo container Unit Load Devices (ULDs), such as LD-1s, LD-2s, LD-3s, LD-3-46s, LD-6s, and LD-8s. In the embodiment of FIG. 2, the container includes a floor 21 for supporting objects within the container. The space above the sloped lower side walls 25 and below the floor 21 may optionally be used for cart movement motors and mechanisms and/or for cart refrigeration means, or the like.

Referring to FIG. 2, a number of food carts 22 are stored within the container 20, each cart 22 having an openable front door 24. The carts 22 may be supported by means for hanging them from the ceiling of the container 20 or supporting them on the floor 21 of the container 20. A passageway 26 extends between the galley 18 and the container 20. The passageway 26 is sized to accommodate the passage of one or more carts during flight. A cart lift 30 (see FIG. 3) is available for automatically transferring galley carts between the galley 18 and the container 20. The cart lift 30 is located in the passageway in a non-blocking manner, i.e., a manner that will leave sufficient space for a person to travel through the passageway without being blocked by the cart lift. Operationally, the carts 22 may be loaded into place at the airport through the passenger deck 12 and cart lift 30, or the carts may be preloaded into the container 20, and the container loaded into the lower lobe region 14 by cargo loading equipment.

Figure 3:
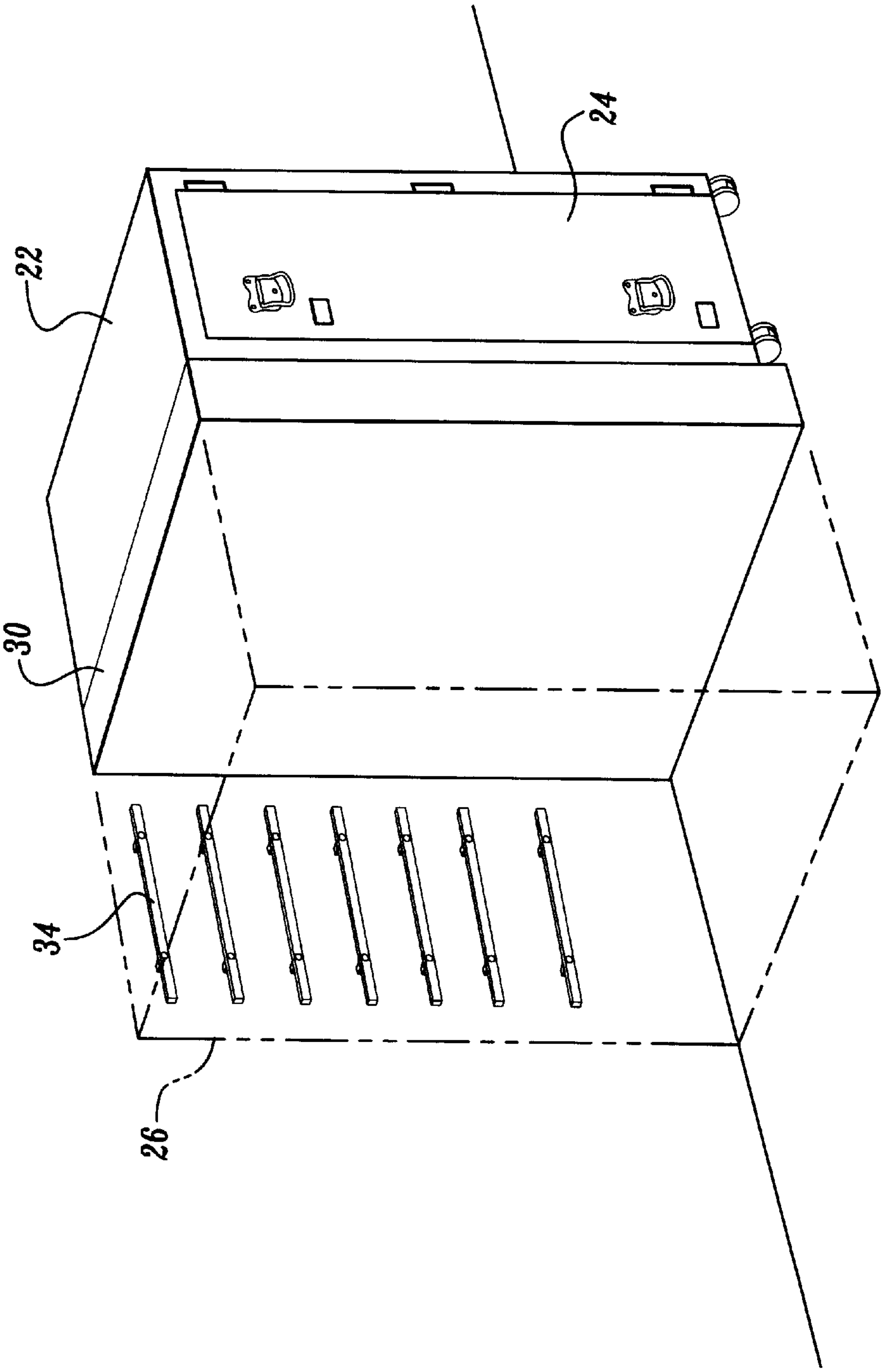
FIG. 3 is a schematic perspective view of one embodiment of a passageway formed in accordance with the present invention.

Still referring to FIG. 3, the galley cart stowage system formed in accordance with the present invention includes access means positionable within the passageway 26 to assist an attendant in physically moving between the passenger deck and the container via the passageway. As will be appreciated by those skilled in the art, there are many different types of access means that may be used, e.g., a plurality of vertically aligned foot holds 34 located in the passageway (as shown in FIG. 3), a ladder insertable into the passageway, a rope, etc.

Figure 4:
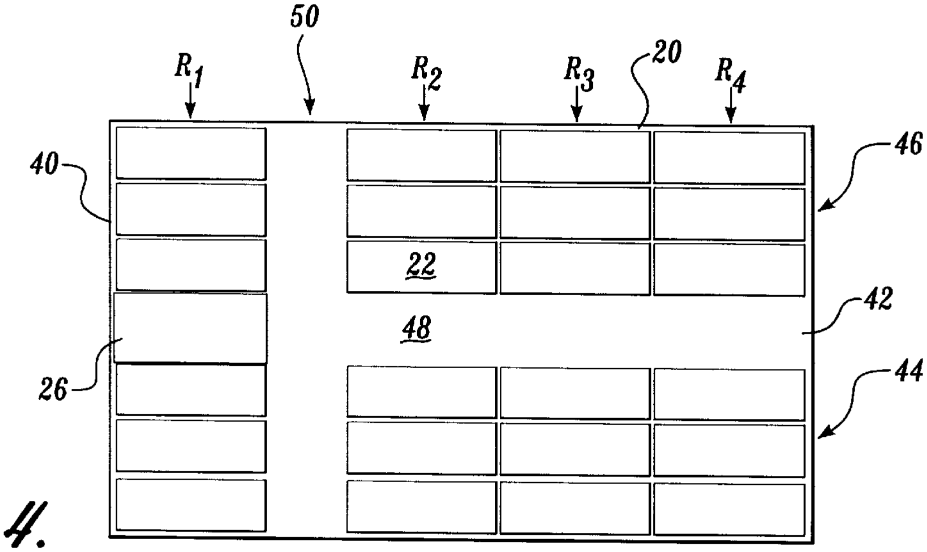
FIGS. 4, 5, and 6 are plan views illustrating one embodiment of a layout formed in accordance with the present invention.
Figure 5:
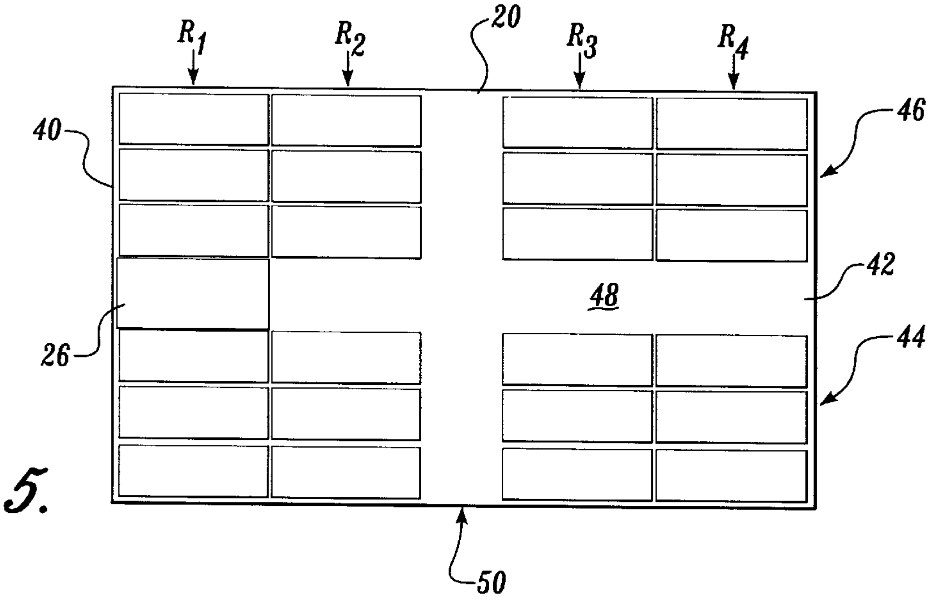
Figure 6:
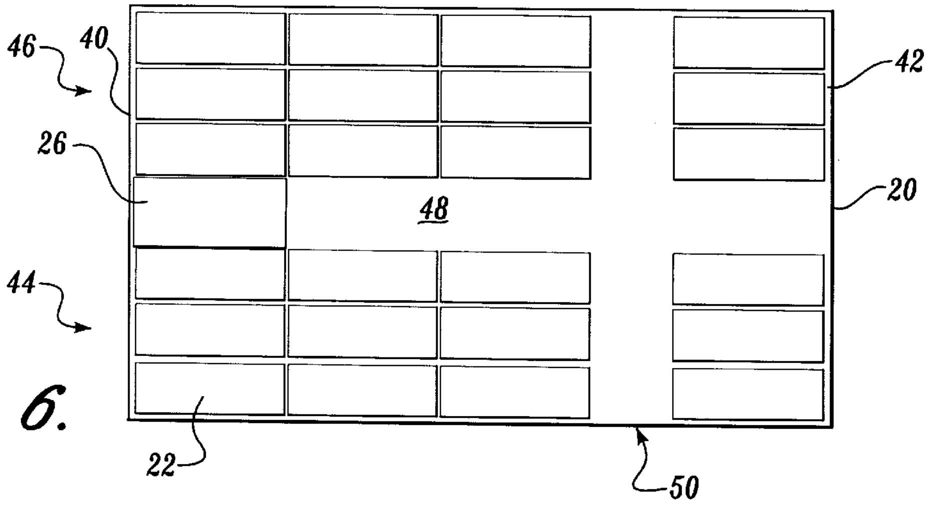

FIGS. 4, 5, and 6 are plan views illustrating one embodiment of a container layout formed in accordance with the present invention. In the embodiment of FIGS. 4–6, the container 20 includes a first end 40 and a second end 42 with the distance there between defining a longitudinal direction. The container further includes a number of interior regions, each extending between the first and second ends. In FIGS. 4–6 the container includes left, right, and middle interior regions 44, 46, 48. The passageway 26 extends down into the middle region 48 at the first end 40 of the container. The remaining portions of the middle region are left open to provide an aisle for the attendant to move within the container. The galley carts are stowed end-to-end in the left and right regions. An access space 50 is left between carts to enable the attendant to retrieve and place objects within the carts.

During normal operations, the access means are made available for a first attendant to enter the container via the passageway. A second attendant uses the cart lift to lower a used cart into the container. The first attendant stows the used cart and places an unused cart on the cart lift. The second attendant retrieves the unused cart using the cart lift. The first attendant then exits the passageway using the access means. As a preferred alternative, some type of automated cart handling components (not shown) may be used within the container to shuffle used carts into and out of the container during normal operations.

During anomalous conditions, the access means is made available to assist the attendant in entering the exiting the container via the passageway. Referring to FIG. 4, the attendant can pass along the middle interior region and access unused carts by translating adjacent carts away from the unused carts. In FIGS. 4–6, there are four rows of carts $R_1$, $R_2$, $R_3$, $R_4$. In FIG. 4, the attendant can access the first row of carts $R_1$ because the access space is between the first and second rows. In FIG. 5, the attendant has translated the second row of carts $R_2$ toward the first row $R_1$, thus opening up an access space between the second and third row of carts. In this manner, all carts can be accessed. In preferred embodiments, the access space is sufficiently large to enable whatever desired contents are stored in the carts to be removed and placed in the carts easily.

Figure 7:
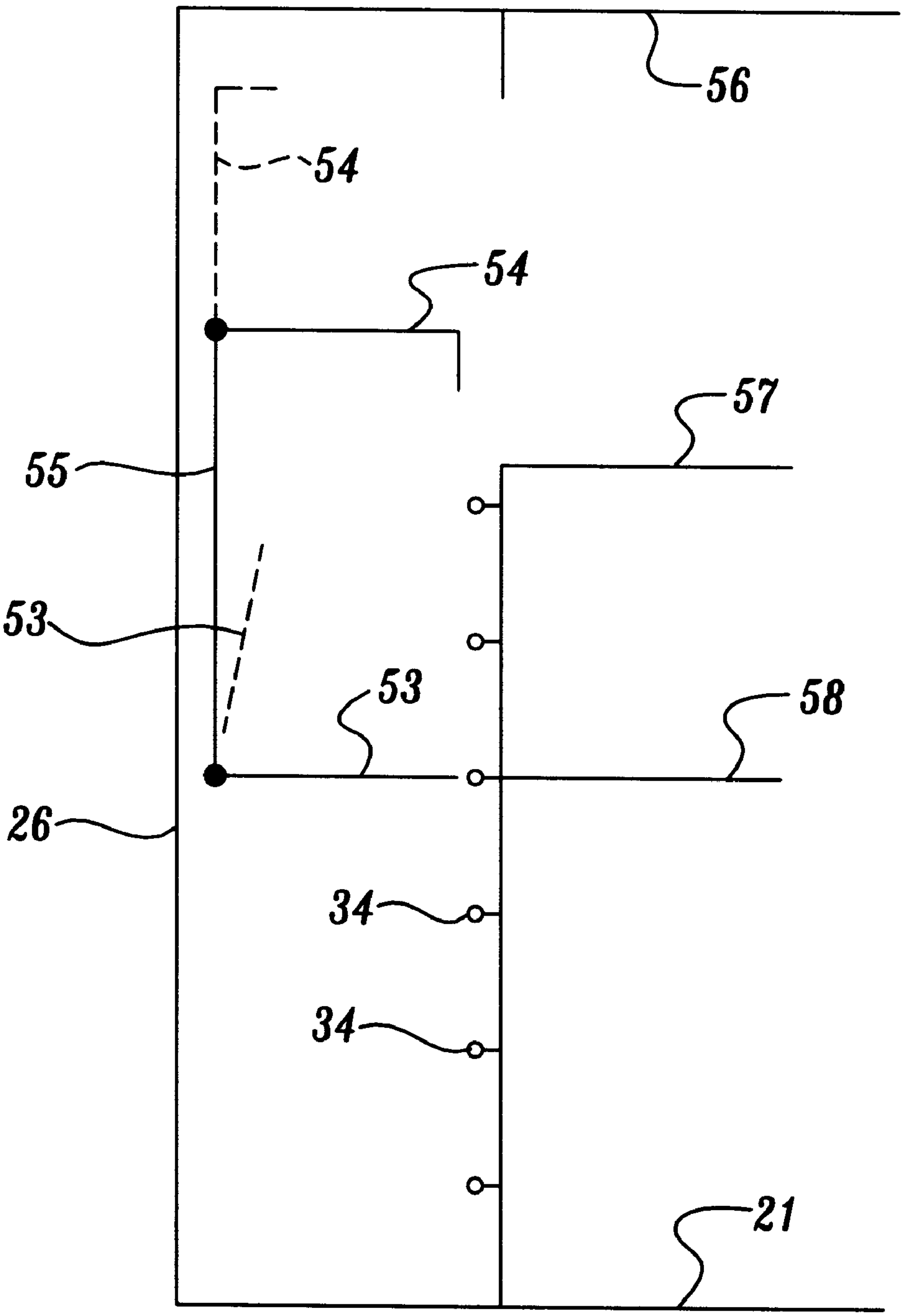
FIG. 7 is a schematic elevation view of an alternative embodiment of the galley cart stowage system formed in accordance with the present invention.

An alternative system of cart stowage is shown with reference to FIG. 7. Access means to the container is through a fold-up or drop-out floor in the cart lift itself, with ladder rung-type access means being available on the sides of the passageway for an attendant to climb down. A cart lift 55 is available in the passageway 26 and is similar to an elevator shaft. The cart lift 55 serves as means for transporting food carts from a level above the passenger deck floor (labeled item 58 in FIG. 7) down to a level below the passenger deck floor but above the container floor 21. A main deck ceiling 56 is above the passenger deck floor 58 and above a galley countertop surface 57. The cart lift includes a floor 53. The floor 53 can be rotated about a rear axis to a folded-up position (shown in phantom). Similarly, the cart lift includes a top 54 that may also be rotated away from a normally horizontal position. An access means is available within the passageway, such as the number of rungs 34 shown. If the cart lift becomes inoperative or disabled, a crew member (e.g., flight attendant) can manually move the cart lift floor and top to their folded-away configurations. Then the crew member can climb down the rungs 34 mounted inside the passageway, to access and enter into the container below the main deck floor 58.

As will be appreciated from a reading of the above, the present invention provides generous amounts of cart storage space to accommodate flights having large meal service requirements. The arrangement also allows the attendant to manually transfer objects to and from the carts if the cart lift is inoperative. In addition, by storing used carts below the passenger deck, any unsightly waste is removed from passenger view.

While the preferred embodiment of the invention has been illustrated and described, it will be appreciated that various changes can be made therein without departing from the spirit and scope of the invention. For example, the container shown herein includes a floor upon which carts are supported and rolled along to provide manual access. Alternatively, the container may include an upper rail system or the like from which carts are hung and translated to provide manual access. The carts in storage may be longitudinally or transversely oriented, as well as the cart lift may be longitudinally or transversely oriented. The cart lift may also incorporate a 90° rotation mechanism to swing a cart from a longitudinal to a transverse orientation or vice versa during some portion of the cart's journey between the passenger deck galley and the lower deck container.

The embodiments of the invention in which an exclusive property or privilege is claimed are defined as follows:

1. An automated cart stowage system in an aircraft having a passenger deck with a galley and a lower deck located below the passenger deck at the galley, the system comprising:

(a) a number of movable galley carts;

(b) a container sized and shaped to be located within the lower deck, the container for storing the plurality of galley carts during flight, the container having a first end and a second end, the distance therebetween defining a longitudinal direction; the container further including first and second interior regions each extending between the first and second ends, the number of galley carts being storable in rows in the second region, an access space being left available between stored carts in the second region; the access space being an empty row oriented transverse to the longitudinal direction;

(c) a passageway located in the container in the first region and extending vertically upward into the galley; the first region otherwise being free of objects;

(d) a cart lift for automatically transferring at least one galley cart at a time between the passenger deck and the container, the cart lift being located in the passageway in a non-blocking manner; and (e) access means postionable within the passageway to assist a person in moving between the passenger deck and the container via the passageway;

wherein during normal operations the cart lift transfers carts between the passenger deck and the container; and wherein during anomalous conditions, the access means are made available to assist the person in entering and exiting the container via the passageway to thereby manually transfer material to and from the carts stored in the container, the first region providing an aisle for the person to access the carts, the access space between carts allowing the person to shift carts longitudinally in order to access each cart without having to remove carts from the container.

2. The automated cart stowage system of claim 1, wherein the access means to the lower lobe cart storage container is through a fold-up or drop-down floor in the cart lift itself, with ladder rungs positioned in the sides of the passageway for an attendant to climb down.

3. The automated cart stowage system of claim 1, wherein the access means is a ladder insertable into the passageway.

4. The automated cart stowage system of claim 1, wherein the access means is a plurality of vertically aligned foot holds located in the passageway.

5. The automated cart stowage system of claim 1, wherein the access means is a rope.

6. The automated cart stowage system of claim 1, wherein the container includes a floor and the carts are supported by and moved along the container floor.

7. The automated cart stowage system of claim 1, wherein the carts stored in the container are longitudinally oriented.

8. The automated cart stowage system of claim 1, wherein the passageway is longitudinally oriented.

9. An automated cart stowage system in an aircraft having a passenger deck with a galley and a lower deck located below the passenger deck at the galley, the system comprising:

(a) a plurality of movable galley carts;

(b) a container sized and shaped to be located within the lower deck, the container for storing the plurality of galley carts during flight, the container having a first end and a second end, the distance therebetween defining a longitudinal direction; the container further including left, right, and middle interior regions each extending between the container first and second ends, the plurality of galley carts being storable in rows in the left and right regions, an access space being left available between the carts in the left and right regions; the access space being an empty row oriented transverse to the longitudinal direction;

(c) a passageway located in the container in the middle region and extending vertically upward into the galley; the middle region otherwise being free of objects;

(d) a cart lift for automatically transferring at least one galley cart at a time between the passenger deck and the container, the cart lift being located in the passageway in a non-blocking manner; and (e) access means positionable within the passageway to assist a person in moving between the passenger deck and the container via the passageway;

wherein during normal operations the cart lift transfers carts between the passenger deck and the container; and wherein during anomalous conditions, the access means may be made available to assist the person in entering and exiting the container via the passageway to thereby manually transfer material to and from the carts stored in the container, the middle region providing an aisle for the person to access the carts, the access space between carts allowing the person to shift carts longitudinally in order to access each cart without having to remove carts from the container.

10. The automated cart stowage system of claim 9, wherein the access means to the lower lobe cart storage container is through a fold-up or drop-down floor in the cart lift itself, with ladder rungs positioned in the sides of the passageway for an attendant to climb down.

11. The automated cart stowage system of claim 9, wherein the carts in storage are longitudinally oriented.

* * * * *